US00RE44737E

(19) United States
(12) Reissued Patent
Raykar et al.

(10) Patent Number: US RE44,737 E
(45) Date of Reissued Patent: Jan. 28, 2014

(54) THREE-DIMENSIONAL POSITION CALIBRATION OF AUDIO SENSORS AND ACTUATORS ON A DISTRIBUTED COMPUTING PLATFORM

(75) Inventors: Vikas C. Raykar, Conshohocken, PA (US); Igor Kozintsev, San Jose, CA (US); Rainer Lienhart, Friedberg (DE)

(73) Assignee: Marvell World Trade Ltd., St. Michael (BB)

(21) Appl. No.: 12/110,216

(22) Filed: Apr. 25, 2008

Related U.S. Patent Documents

Reissue of:
(64) Patent No.: 7,035,757
Issued: Apr. 25, 2006
Appl. No.: 10/435,231
Filed: May 9, 2003

(51) Int. Cl.
*G01C 19/00* (2013.01)
*G01C 17/00* (2006.01)

(52) U.S. Cl.
USPC ..... 702/150; 702/152

(58) Field of Classification Search
USPC ..... 702/150, 159
See application file for complete search history.

(56) References Cited

U.S. PATENT DOCUMENTS

| | | | | |
|---|---|---|---|---|
| 3,559,161 | A | 1/1971 | Raudsep | |
| 4,555,779 | A | 11/1985 | Roberts | |
| 5,691,922 | A * | 11/1997 | McEwan et al. | 702/158 |
| 5,778,082 | A | 7/1998 | Chu et al. | |
| 5,859,595 | A * | 1/1999 | Yost | 340/7.38 |
| 5,959,568 | A | 9/1999 | Woolley | |
| 5,970,413 | A | 10/1999 | Gilhousen | |
| 5,986,971 | A * | 11/1999 | Kim et al. | 367/8 |
| 6,201,499 | B1 | 3/2001 | Hawkes et al. | |
| 6,243,471 | B1 | 6/2001 | Brandstein et al. | |
| 6,643,516 | B1 | 11/2003 | Stewart | |
| 6,661,342 | B2 | 12/2003 | Hall et al. | |
| 6,662,137 | B2 | 12/2003 | Squibbs | |
| 6,677,895 | B1 | 1/2004 | Holt | |
| 6,941,246 | B2 | 9/2005 | Raykar et al. | |
| 2002/0077772 | A1 * | 6/2002 | Squibbs | 702/159 |
| 2002/0097885 | A1 | 7/2002 | Birchfield et al. | |
| 2002/0150263 | A1 | 10/2002 | Rajan | |
| 2002/0155845 | A1 | 10/2002 | Martorana | |

(Continued)

FOREIGN PATENT DOCUMENTS

| | | |
|---|---|---|
| GB | 2 329 778 | 3/1999 |
| GB | 2 329 778 A | 3/1999 |

(Continued)

OTHER PUBLICATIONS

Office Action for corresponding European Application No. 04 760 779.1-2212, dated Dec. 21, 2009.

(Continued)

*Primary Examiner* — Mischita Henson

(57) ABSTRACT

A first computing device transmitting a wireless signal to a second and third computing devices, the signal requesting an actuator of the second computing device generate an acoustic signal to be received by a sensor of the third computing device, wherein the actuator and sensor are unsynchronized. The first computing device computes, based on an time estimate for the acoustic signal to travel from the actuator of the second computing device to the sensor of the third computing device, a physical location of the actuator of the second computing device and the sensor of the third computing device.

82 Claims, 3 Drawing Sheets

(Amended)

(56) References Cited

U.S. PATENT DOCUMENTS

| | | | | |
|---|---|---|---|---|
| 2002/0168989 | A1 | 11/2002 | Dooley et al. | |
| 2003/0012168 | A1 | 1/2003 | Elson et al. | |
| 2003/0014486 | A1 | 1/2003 | May | |
| 2003/0114170 | A1 | 6/2003 | Rick et al. | |
| 2003/0129996 | A1 | 7/2003 | Maloney et al. | |
| 2003/0174086 | A1 | 9/2003 | Hirt | |
| 2003/0236866 | A1 | 12/2003 | Light | |
| 2004/0109417 | A1* | 6/2004 | Castro et al. | 370/238 |
| 2004/0170289 | A1 | 9/2004 | Whan | |

FOREIGN PATENT DOCUMENTS

| | | |
|---|---|---|
| WO | WO 01/26335 | 10/2000 |
| WO | WO 01/26335 A | 4/2001 |
| WO | PCT/US2004/008587 | 1/2005 |

OTHER PUBLICATIONS

Written Opinion in corresponding Singapore application No. 200505757-4, issued by the Austrian Patent Office on Jun. 29, 2007.
Written Opinion in corresponding Singapore application No. 200506757-4, issued by the Austrian Patent Office on May 30, 2008.
First Office Action in corresponding Chinese application No. 2004100347403 issued by the State Intellectual Property Office of the People's Republic of China, Oct. 27, 2006.
Second Office Action in corresponding Chinese application No. 2004100347403 issued by the State Intellectual Property Office of the People's Republic of China, Jun. 6, 2008.
International Search Report for PCT US2004/008587, dated Jan. 7, 2005.
Written Opinion for PCT US2004/008587, dated Jan. 7, 2005.
Bulusu, Nirupama, et al., "Scalable Coordination for Wireless Sensor Networks: Self-Configuring Localization Systems," Proceedings of the 6th International Symposium on Communication Theory and Applications (ISCTA '01), Ambleside, Lake District, UK, Jul. 2001, 6 pages.
Girod, Lewis, et al., "Locating tiny sensors in time and space: A case study," Proceedings of the 2002 IEEE International Conference on Computer Design: VLSI in Computers and Processors (ICCD '02), Freiburg, Germany, Sep. 16-18, 2002, 6 pages.
Moses, Randolph L., et al., "A Self-Localization Method for Wireless Sensor Networks," EURASIP Journal on Applied Signal Processing 2003-4, .COPYRGT. 2003 Hindawai Publishing Corporation, pp. 348-358.
Raykar, Vikas C., et al., "Self Localization of acoustic sensors and actuators on Distributed platforms," Proceedings. 2003 International Workshop on Multimedia Technologies in E-Learning and Collaboration, Nice, France, Oct. 2003, 8 pages.
Sachar, Joshua M., et al., "Position Calibration Of Lage-Aperture Microphone Arrays," 2002 IEEE International Conference on Acoustics, Speech, and Signal Processing, vol. 2, 2002, pp. 1797-1800.
Savvides, Andreas, et al., "Dynamic Fine-Grained Localization in Ad-Hoc Networks of Sensors," in the proceedings of the International Conference on Mobile Computing and Networking (MobiCom) 2001, Rome, Italy, Jul. 2001, pp. 166-179.
Examination Report in corresponding Singapore application No. 200506757-4, issued by the Austrian Patent Office on Jul. 23, 2009.
Office Action for corresponding European Application No. 04 760 779.1-2212, dated Apr. 11, 2011.
Result of Consultation for corresponding European Application No. 04 760 779.1, dated Nov. 21, 2011.
Communication Under Rule 73(3) EPC for corresponding European Application No. 04 760 779.1, dated Dec. 19, 2011.
Office Action for corresponding European Application No. 11 009 918.1-2212, dated Dec. 20, 2012.
European Search Report for corresponding European Application No. 11 00 9918,1, dated Apr. 23, 2012.
Morset, "How to measure the initial time delay (distance between the loudspeaker and the microphone)?", Morset Sound Development, Jul. 25, 2002, pp. 1-3, available at http://www.nvo.com/winmls/nss-folder/discussion/
How%20to%20measure%20distance%20loudspeaker1miscrophone.doc.
Walker, "The Truth About Latency," Sound on Sound, Sep. 2002 pp. 1-7, available at http://www.soundonsound.com/sos/Sep02/articles/pcmusician0902.asp?print=yes.
Office Action for corresponding European Application No. 11 009 918.1, dated Sep. 27, 2013.

* cited by examiner

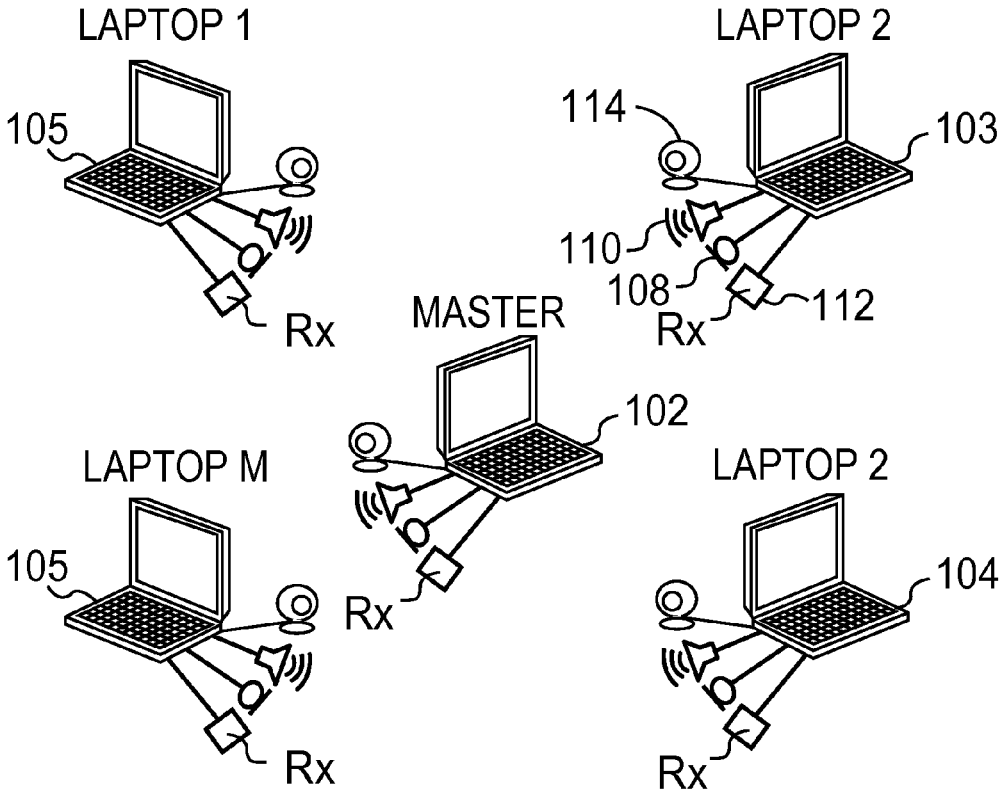
FIG. 1
(Amended)

THREE-DIMENSIONAL POSITION CALIBRATION OF AUDIO SENSORS AND ACTUATORS ON A DISTRIBUTED COMPUTING PLATFORM

Matter enclosed in heavy brackets [ ] appears in the original patent but forms no part of this reissue specification; matter printed in italics indicates the additions made by reissue.

TECHNICAL FIELD

Embodiments described herein relate to position calibration of audio sensors and actuators in a distributed computing platform.

BACKGROUND

Many emerging applications like multi-stream audio/video rendering, hands free voice communication, object localization, and speech enhancement, use multiple sensors and actuators (like multiple microphones/cameras and loudspeakers/displays, respectively). However, much of the current work has focused on setting up all the sensors and actuators on a single platform. Such a setup would require a lot of dedicated hardware. For example, to set up a microphone array on a single general purpose computer, would typically require expensive multichannel sound cards and a central processing unit (CPU) with larger computation power to process all the multiple streams.

Computing devices such as laptops, personal digital assistants (PDAs), tablets, cellular phones, and camcorders have become pervasive. These devices are equipped with audio-visual sensors (such as microphones and cameras) and actuators (such as loudspeakers and displays). The audio/video sensors on different devices can be used to form a distributed network of sensors. Such an ad-hoc network can be used to capture different audio-visual scenes (events such as business meetings, weddings, or public events) in a distributed fashion and then use all the multiple audio-visual streams for an emerging applications. For example, one could imagine using the distributed microphone array formed by laptops of participants during a meeting in place of expensive stand alone speakerphones. Such a network of sensors can also be used to detect, identify, locate and track stationary or moving sources and objects.

To implement a distributed audio-visual I/O platform, includes placing the sensors, actuators and platforms into a space coordinate system, which includes determining the three-dimensional positions of the sensors and actuators.

DESCRIPTION OF DRAWINGS

FIG. 1 illustrates a schematic representation of a distributed computing in accordance with one embodiment.

DETAILED DESCRIPTION

Embodiments of a three-dimensional position calibration of audio sensors and actuators in a distributed computing platform are disclosed. In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates a schematic representation of a distributed computing platform consisting of a set of General-Purpose Computers (GPC) 102-106 (sometimes referred to as computing devices). GPC 102 is configured to be the master, and performs the location estimation. The GPCs (102-106) shown in FIG. 1 may include a personal computer (PC), laptop, PDA, tablet PC, or other computing devices. In one embodiment, each GPC is equipped with audio sensors 108 (e.g., microphones), actuators 110 (e.g., loudspeakers), and wireless communication capabilities 112, *and cameras 114*. As is explained in more detail below, the sensors and actuators of the multiple GPCs are used to estimate their respective physical locations.

For example, in one embodiment, given a set of M acoustic sensors and S acoustic actuators in unknown locations, one embodiment estimates their respective three dimensional coordinates. The acoustic actuators are excited using a predetermined calibration signal such as a maximum length sequence or chirp signal, and the time of arrival (TOA) is estimated for each pair of the acoustic actuators and sensors. In one embodiment, the TOA for a given pair of microphone and speakers is defined as the time for the acoustic signal to travel from the speaker to the microphone. Measuring the TOA and knowing the speed of sound in the acoustical medium, the distance between each acoustical signal source and the acoustical sensors can be calculated, thereby determining the three dimensional positions of the actuators and the sensors.

Figure 2:
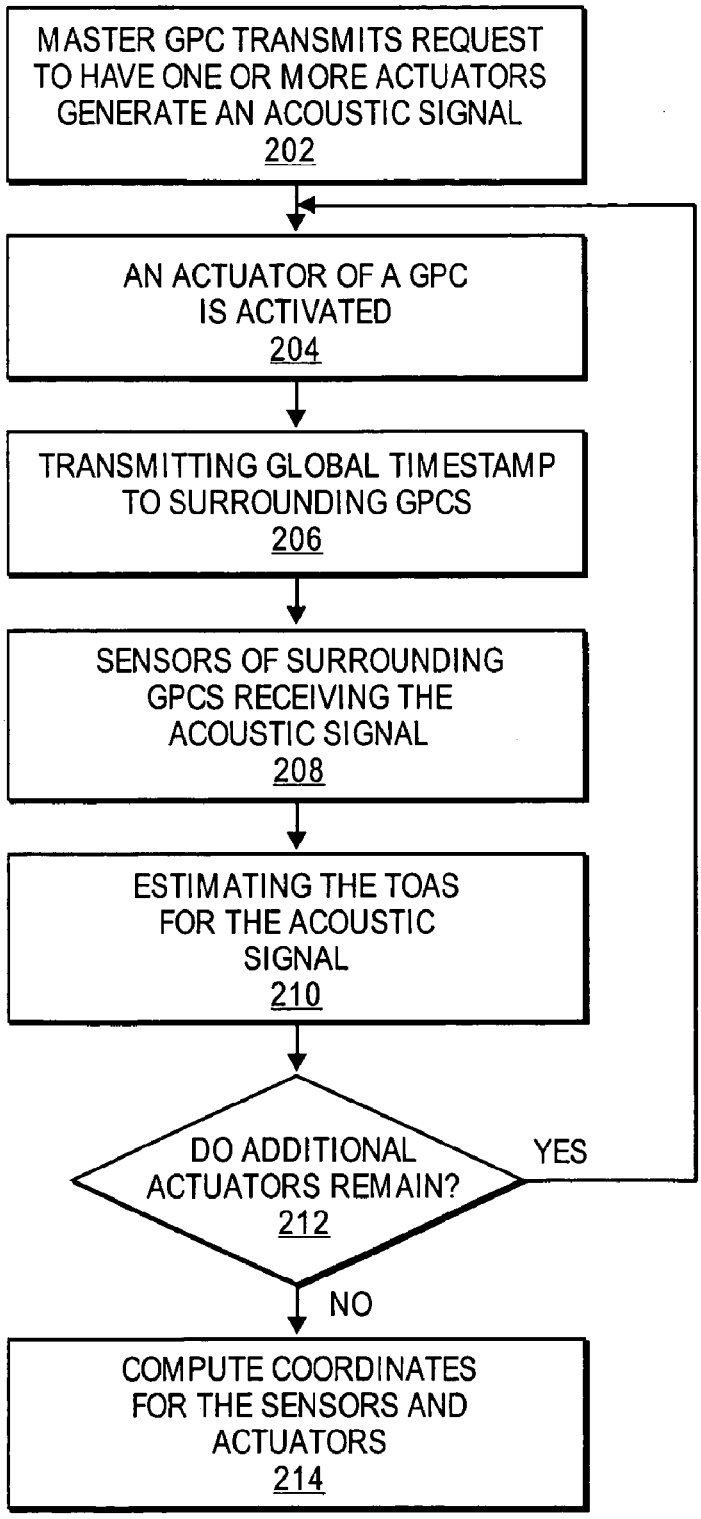
FIG. 2 is a flow diagram describing the process of generating position ion for audio sensors and actuators in accordance with one embodiment.

FIG. 2 is a flow diagram describing, in greater detail, the process of generating the three-dimensional position calibration of audio sensors and actuators in a distributed computing platform, according to one embodiment. The process described in the flow diagram of FIG. 2 periodically references the GPCs of the distributed computer platform illustrated in FIG. 1.

In block 202, a first GPC 102, which may be considered the master GPC of the distributed platform, transmits a wireless signal to a surrounding set of GPCs in the distributed platform (the actual number of GPCs included in the distributed platform may vary based on implementation). The signal from the first GPC 102 includes a request that a specific actuator of one of the GPCs (e.g., second GPC 103) be excited to generate an acoustic signal to be received by the sensors of the surrounding GPCs (e.g., GPC 102, 104-106). In one embodiment, the initial wireless signal from the master GPC 102 identifies the specific actuator 110 to be excited.

In response to the signal from the master GPC 102, in block 204 the second GPC 103 excites the actuator 110 to generate an acoustic signal. In one embodiment, the acoustic signal may be a maximum length sequence or chirp signal, or another predetermined signal. In block 206, the second GPC 103 also transmits a first global time stamp to the other GPCs

104-106. In one embodiment, the global time stamp identifies when the second GPC 103 initiated the actuation of the actuator 110 for the second GPC 103. In block 208, the sensors of the GPCs 102, 104-106, receive the acoustic signal generated by the second GPC 103.

In block 210, the time for the acoustic signal to travel from the actuator 110 of the second GPC 103 to the respective sensors (hereinafter referred to as Time of Arrival (TOA)), is estimated. In one embodiment, the TOA for a given pair of a microphone and speaker is defined as the time taken by the acoustic signal to travel form the speaker to the microphone.

In one embodiment, the GPCs that receive the acoustic signal via their sensors, proceed to estimate the respective TOAs. In one embodiment, there exists a common clock in the distributed platform so that GPCs 102-106 are able to determine the time of arrival of audio samples captured by the respective sensors. As a result, the TOA can be estimated based on the difference between the first global time stamp issued by the second GPC 103 and the time of when the acoustic signal is received by a sensor.

Considering, however, that sensors are distributed on different platforms, the audio stream among the different GPCs are typically not synchronized in time (e.g., analog-to-digital and digital-to-analog converters of actuators and sensors of the different GPCs are unsynchronized). As a result, the estimated TOA does not necessarily correspond to the actual TOA. In particular, the TOA of the acoustic signal may include an emission start time, which is defined as the time after which the sound is actually emitted from the speaker (e.g., actuator 110) once the command has been issued from the respective GPC (e.g., GPC 103). The actual emission start time is typically never zero and can actually vary in time depending on the sound card and processor load of the respective GPC.

Therefore, to account for the variations in the emission start time, multiple alternatives may be used. For example, in one embodiment, if multiple audio input channels are available on the GPC exciting an actuator, then one of the output channels can be connected directly to one of the input channels forming a loop-back. Source emission start time can then be estimated for a given speaker, and can be globally transmitted to the other GPCs 102, 104-106 to more accurately determine the respective TOAs. Furthermore, in one embodiment, in the case of using the loop-back, the estimated emission start time will be included in the global time stamp transmitted by the respective GPC.

Once the TOAs for the acoustic signal have been estimated by the receiving GPCs 104-106, which may include accounting for the unknown emission start time as described above, the TOAs are transmitted to the master GPC 102. In an alternative embodiment, the TOAs can be computed by the master GPC 102, in which case each sensor of GPCs 104-106 generate a second global timestamp of when the acoustic signals arrived, respectively. In the alternative embodiment, the master GPC 102 uses the first global time stamp (identifying when the second GPC 103 initiated the actuation of the actuator 110) and the second global time stamps to estimate the TOAs for the respective pairs of actuators and sensors. In such as case, the master GPC 102 may also estimate the emission start time of the acoustic signal to estimate the TOAs.

In decision block 212, if additional actuators remain in the distributed platform, the processes of blocks 202-210 are repeated to have each of the actuators in the platform generate an acoustic signal to determine the TOAs with respective receiving sensors. In an alternative embodiment, multiple separate actuators may be actuated in parallel, wherein the actuator signals are multiplexed by each actuator using a unique signal (e.g., different parameters for chirp or MLS signals). In the case of actuating the multiple separate actuators in parallel, the master GPC 102 identifies to each actuator a unique signal parameters to be used when exciting the actuator.

Figure 3:
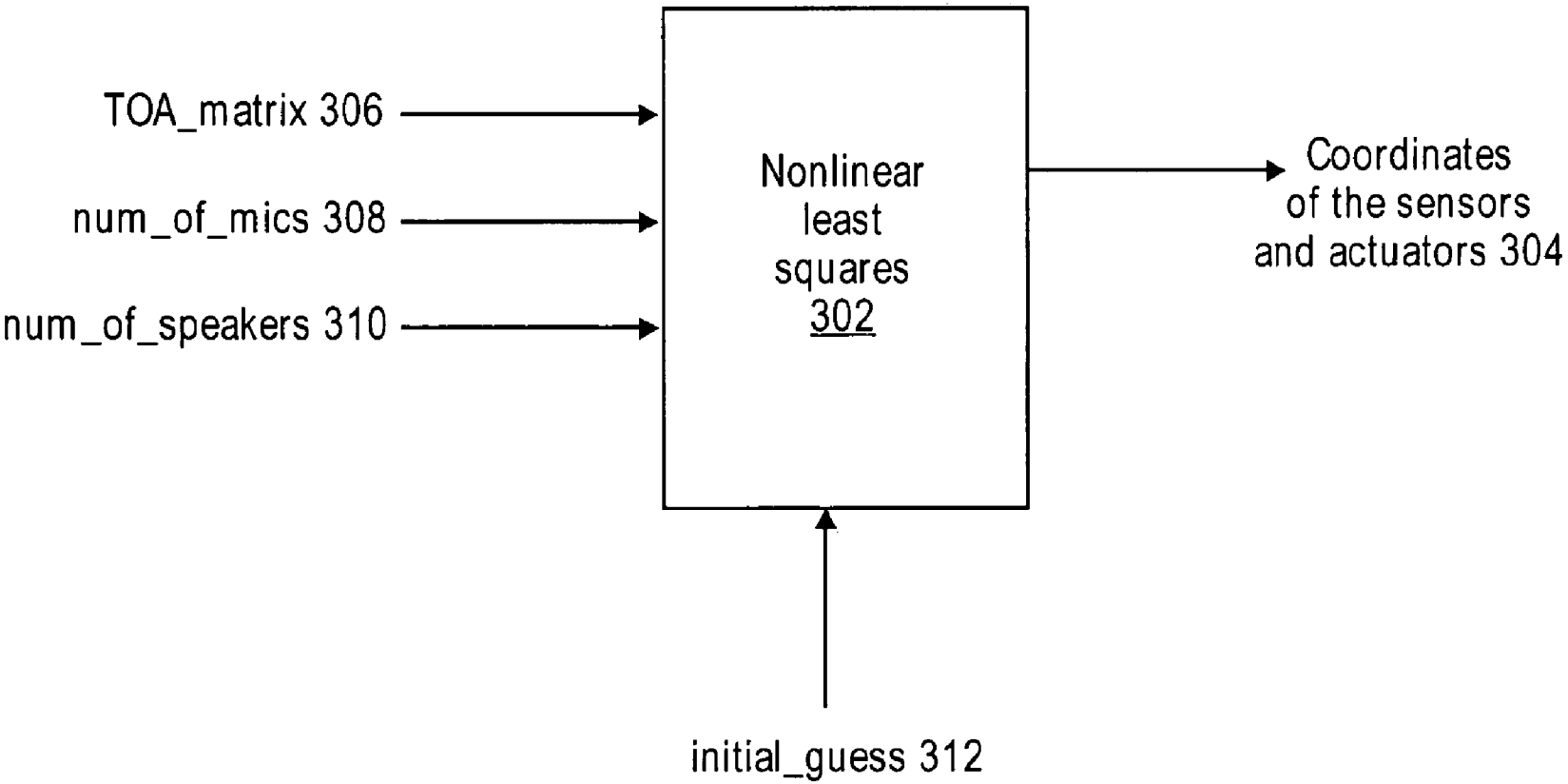
FIG. 3 illustrates a computation scheme to generate position coordinates.

Once all of the TOAs for the different pairs of actuators and sensors have been computed and transmitted to the master GPC 102, in block 214 the master GPC 102 computes the coordinates of the sensors and the actuators. More specifically, as illustrated in the position computation scheme of FIG. 3, in one embodiment the master GPC 102, utilizes a nonlinear least squares (NLS) computation 302 to determine the coordinates 304 of the actuators and/or sensors. In one embodiment, the NLS computation 302 considers the TOAs 306, the number of microphones 308 and the number of speakers 310 in the platform, along with an initial estimation 312 at the coordinates of the actuators and speakers. The actual computation used by the master GPC 102 to compute the coordinates of the actuators and sensors based on the TOAs may vary based on implementation. For example, in an alternative embodiment to compute the positions of sensors and actuators with unknown emission start times, the NLS procedure is used to jointly estimate the positions and the emission times. Emission times add extra S (number of actuators) variables to the computation procedure.

To provide the initial estimation as used by the NLS, several alternatives are available. For example, if an approximate idea of the microphone and speaker positions is available, then the initialization may be done manually. In another embodiment, the use of one or more cameras may provide a rough estimate to be used as the initial estimation.

An additional embodiment to generate an initial estimation includes assuming that microphones and speakers on a given computing platform are approximately at the same position, and given all estimates of the pairwise distances between the separate GPCs, a multidimensional scaling approach may be used to determine the coordinates from, in one embodiment, the Euclidean distance matrix. The approach involves converting the symmetric pairwise distance matrix to a matrix of scalar products with respect to some origin and then performing a singular value decomposition to obtain the matrix of coordinates. The matrix coordinates in turn, may be used as the initial guess or estimate of the coordinates for the respective GPCs, and the microphones and speakers located on them.

The techniques described above can be stored in the memory of one of the computing devices or GPCs as a set of instructions to be executed. In addition, the instructions to perform the processes described above could alternatively be stored on other forms of computer and/or machine-readable media, including magnetic and optical disks. Further, the instructions can be downloaded into a computing device over a data network in a form of compiled and linked version.

Alternatively, the logic to perform the techniques as discussed above, could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

These embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method comprising:

an actuator of a first computing device generating an acoustic signal, *wherein a time-varying delay occurs between when the first computing device issues a command to generate the acoustic signal and when the actuator generates the acoustic signal, the time-varying delay at least due to time-varying processor load of the first computing device;*

*transmitting, with the first computing device, a timestamp indicating when the first computing device issued the command to generate the acoustic signal*;

a sensor of a second computing device receiving the acoustic signal;

generating an estimate of a time for the acoustic signal to travel from the actuator *of the first computing device* to the sensor *of the second computing device based on the timestamp indicating when the first computing device issued the command to generate the acoustic signal*, wherein the sensor *of the second computing device* and actuator *of the first computing device* are unsynchronized;

a third computing device computing, based on the [time] estimate *of the time for the acoustic signal to travel from the actuator of the first computing device to the sensor of the second computing device*, a physical location of at least one of a set including the sensor of the second computing device and the actuator of the first computing device, *wherein computing the physical location of at least one of the set including the sensor of the second computing device and the actuator of the first computing device includes jointly estimating, using a nonlinear least squares (NLS) computation, (i) the physical location of the at least one of the set including the sensor of the second computing device and the actuator of the first computing device and (ii) the time-varying delay between when the first computing device issues the command to generate the acoustic signal and when the actuator generates the acoustic signal;* a sensor of *a* fourth computing device receiving the acoustic signal; and generating [a second] *an* estimate of a time for the acoustic signal to travel from the actuator *of the first computing device* to the sensor of the fourth computing device *based on the timestamp indicating when the first computing device issued the command to generate the acoustic signal*, wherein the actuator of the first computing device and the sensor of the fourth computing device are unsynchronized; and the third computing device computing, based on the [second] estimate of *the* time *for the acoustic signal to travel from the actuator of the first computing device to the sensor of the fourth computing device*, a physical location of at least one of a set including the sensor of the fourth computing device and the actuator of the first computing device, *wherein computing the physical location of at least one of the set including the sensor of the fourth computing device and the actuator of the first computing device includes jointly estimating, using the NLS computation, (i) the physical location of the at least one of the set including the sensor of the fourth computing device and the actuator of the first computing device and (ii) the time-varying delay between when the first computing device issues the command to generate the acoustic signal and when the actuator generates the acoustic signal.*

2. The method of claim 1, wherein the method further includes:

an actuator of the second computing device generating a second acoustic signal, *wherein a second time-varying delay occurs between when the second computing device issues a command to generate the second acoustic signal and when the actuator of the second computing device generates the second acoustic signal, the second time-varying delay at least due to time-varying processor load of the second computing device;*

*transmitting, with the second computing device, a second timestamp indicating when the second computing device issued the command to generate the second acoustic signal*;

a sensor of a first computing device receiving the *second* acoustic signal;

generating [a third] *an* estimate of a time for the second acoustic signal to travel from the actuator of the second computing device to the sensor of the first computing device *based on the second timestamp indicating when the second computing device issued the command to generate the second acoustic signal*; and the third computing device computing, based on the [third] estimate of *the* time *for the second acoustic signal to travel from the actuator of the second computing device to the sensor of the first computing device*, a physical location of at least one of a set including the sensor of the first computing device and the actuator of the second computing device, *wherein computing the physical location of at least one of the set including the sensor of the first computing device and the actuator of the second computing device includes jointly estimating, using the NLS computation, (i) the at least one of the set including the sensor of the first computing device and the actuator of the second computing device and (ii) the second time-varying delay between when the second computing device issues the command to generate the second acoustic signal and when the actuator of the second computing device generates the second acoustic signal.*

3. The method of claim 2, wherein the actuator *of the first computing device* is a speaker.

4. The method of claim 3, wherein the sensor *of the second computing device* is a microphone.

5. The method of claim 4, wherein the acoustic signals generated by the first and second computing devices are selected from a group comprising of maximum length sequence signal and a chirp signal.

[6. The method of claim 1, further including:

estimating an emission start time of when the acoustic signal was emitted from the actuator.]

[7. The method of claim 6, wherein the estimating of the emission start time includes the first computing device using a loopback device to estimate the emission start time; and using the emission start time to determine the estimate of a time for the acoustic signal to travel from the actuator of the first computing device to the sensor second computing device.]

8. The method of claim 1, wherein the method further includes prior to the third computing device computing the physical locations, computing an initial estimation of the physical location of the sensor of the second computer and actuator of the first computer via a video modality.

9. The method of claim 1, wherein the method further includes prior to the third computing device computing the physical locations of the sensor of the second computer, computing an initial estimation of the physical location of the sensor of the second computer and actuator of the first computer via multidimensional scaling.

10. A method comprising:

a first computing device transmitting a wireless signal to a second *computing device* and *a* third computing [devices] *device*, the signal requesting an actuator of the second computing device generate an acoustic signal to be received by a sensor of the third computing device, wherein the actuator and sensor are unsynchronized *at least due to a time-varying delay occurs between when the second computing device issues a command to generate the acoustic signal and when the actuator generates the acoustic signal, the time-varying delay at least due to time-varying processor load of the second computing device*; and the first computing device computing, based on a time estimate for the acoustic signal to travel from the actuator of the second computing device to the sensor of the third computing device, a physical location of at least one of a set including the actuator of the second computing device and the sensor of the third computing device*;*

*wherein computing the physical location of at least one of the set including the actuator of the second computing device and the sensor of the third computing device includes jointly estimating, using a nonlinear least squares (NLS) computation, (i) the at least one of the set including the actuator of the second computing device and the sensor of the third computing device and (ii) the time-varying delay between when the second computing device issues the command to generate the acoustic signal and when the actuator generates the acoustic signal.*

11. The method of claim 10, wherein the method further includes:

the first computing device transmitting the wireless signal to the second *computing device* and a fourth computing [devices] *device*, the signal requesting the actuator of the second computing device generate the acoustic signal to be received by a sensor of the fourth computing device, wherein the actuator and the sensor of the fourth computing device are unsynchronized; and the first computing device computing, based on an time estimate for the acoustic signal to travel from the actuator of the second computing device to the sensor of the fourth computing device, a physical location of at least one of a set including the actuator of the second computing device and the sensor of the fourth computing device*;*

*wherein computing the physical location of at least one of the set including the actuator of the second computing device and the sensor of the fourth computing device includes jointly estimating, using the NLS computation, (i) the at least one of the set including the actuator of the second computing device and the sensor of the fourth computing device and (ii) the time-varying delay between when the second computing device issues the command to generate the acoustic signal and when the actuator generates the acoustic signal.*

12. The method of claim 11, wherein the method further includes:

the first computing device transmitting a second wireless signal to the second *computing device* and *the* third computing [devices] *device*, the signal requesting an actuator of the third computing device generate [an] *a second* acoustic signal to be received by a sensor of the second computing device, wherein the actuator of the third computing device and a sensor of the second computing device are unsynchronized *at least due to a second time-varying delay occurs between when the third computing device issues a command to generate the second acoustic signal and when the actuator of the third computing device generates the second acoustic signal, the second time-varying delay at least due to time-varying processor load of the third computing device*; and the first computing device computing, based on [an] *a* time estimate for the *second* acoustic signal to travel from the actuator of the third computing device to the sensor of the second computing device, a physical location of at least one of a set including the actuator of the third computing device and the sensor of the second computing device*;*

*wherein computing the physical location of at least one of the set including the actuator of the third computing device and the sensor of the second computing device includes jointly estimating, using the NLS computation, (i) the at least one of the set including the actuator of the third computing device and the sensor of the second computing device and (ii) the second time-varying delay between when the third computing device issues the command to generate the second acoustic signal and when the actuator of the third computing device generates the second acoustic signal.*

13. The method of claim 12, wherein the actuator *of the second computing device* is a speaker.

14. The method of claim 13, wherein the sensor *of the third computing device* is a microphone.

15. The method of claim 14, wherein the acoustic signals to be generated by the second and third computing devices are selected from a group comprising of maximum length sequence signal, and a chirp signal.

[16. The method of claim 10, further including: estimating an emission start time of when the acoustic signal was emitted from the actuator of the second computing device.]

[17. The method of claim 16, wherein estimating the emission start time includes the second computing device using a loopback device to estimate the emission start time; using emission start time to determine the estimate of a time for the acoustic signal to travel from the actuator of the second computing device to the sensor third computing device.]

18. The method of claim 10, wherein the method further includes:

prior to the first computer determining a physical location of at least one of the group including the actuator of the second computing device and the sensor of the third computer, the first computer computing an initial estimation of the physical location of the actuator of the second computer and the sensor of the third computing device via video modality.

19. The method of claim [10] *11*, wherein the method further includes:

prior to the first computer determining a physical location of at least one of the group including the actuator of the second computing device and the sensor of the [third] *fourth* computer, the first computer computing an initial estimation of the physical location of the actuator of the second computer and the sensor of the [third] *fourth* computing device via video modality.

20. A *non-transitory* machine readable medium having stored thereon a set of instructions, which when executed, cause the machine to perform a method comprising [of]:

an actuator of a first computing device generating an acoustic signal, *wherein a time-varying delay occurs between when the first computing device issues a command to generate the acoustic signal and when the actuator generates the acoustic signal, the time-varying delay at least due to time-varying processor load of the first computing device;*

*transmitting, with the first computing device, a timestamp indicating when the first computing device issued the command to generate the acoustic signal*;

a sensor of a second computing device receiving the acoustic signal;

generating an estimate of a time for the acoustic signal to travel from the actuator *of the first computing device* to the sensor *of the second computing device based on the timestamp indicating when the first computing device issued the command to generate the acoustic signal*, wherein the sensor *of the second computing device* and *the* actuator *of the first computing device* are unsynchronized; and a third computing device computing, based on the [time] estimate *of the time for the acoustic signal to travel from the actuator of the first computing device to the sensor of the second computing device*, a physical location of at least one of a set including the sensor of the second computing device and the actuator of the first computing device, *wherein computing the physical location of at least one of the set including the sensor of the second computing device and the actuator of the first computing device includes jointly estimating, using a nonlinear least squares (NLS) computation, (i) the at least one of the set including the sensor of the second computing device and the actuator of the first computing device and (ii) the time-varying delay between when the first computing device issues the command to generate the acoustic signal and when the actuator generates the acoustic signal.*

21. The *non-transitory* machine readable medium of claim 20, wherein the method further includes:

a sensor of a fourth computing device receiving the acoustic signal; and generating [a second] *an* estimate of a time for the acoustic signal to travel from the actuator *of the first computing device* to the sensor of the fourth computing device *based on the timestamp indicating when the first computing device issued the command to generate the acoustic signal*, wherein the actuator of the first computing device and the sensor of the fourth computing device are unsynchronized; and the third computing device computing, based on the [second] estimate of time *for the acoustic signal to travel from the actuator of the first computing device to the sensor of the fourth computing device*, a physical location of at least one of a set including the sensor of the fourth computing device and the actuator of the first computing device, *wherein computing the physical location of at least one of the set including the sensor of the fourth computing device and the actuator of the first computing device includes jointly estimating, using the NLS computation, (i) the at least one of the set including the sensor of the fourth computing device and the actuator of the first computing device and (ii) the time-varying delay between when the first computing device issues the command to generate the acoustic signal and when the actuator generates the acoustic signal.*

22. The *non-transitory* machine readable medium of claim 21, wherein the method further includes:

an actuator of the second computing device generating a second acoustic signal, *wherein a second time-varying delay occurs between when the second computing device issues a command to generate the second acoustic signal and when the actuator of the second computing device generates the second acoustic signal, the second time-varying delay at least due to time-varying processor load of the second computing device;*

*transmitting, with the second computing device, a second timestamp indicating when the second computing device issued the command to generate the second acoustic signal*;

a sensor of a first computing device receiving the *second* acoustic signal;

generating [a third] *an* estimate of a time for the second acoustic signal to travel from the actuator of the second computing device to the sensor of the first computing device *based on the second timestamp indicating when the second computing device issued the command to generate the second acoustic signal*; and the third computing device computing, based on the [third] estimate of time *for the second acoustic signal to travel from the actuator of the second computing device to the sensor of the first computing device*, a physical location of at least one of a set including the sensor of the first computing device and the actuator of the second computing device, *wherein computing the physical location of at least one of the set including the sensor of the first computing device and the actuator of the second computing device includes jointly estimating, using the NLS computation, (i) the at least one of the set including the sensor of the first computing device and the actuator of the second computing device and (ii) the second time-varying delay between when the second computing device issues the command to generate the second acoustic signal and when the actuator of the second computing device generates the second acoustic signal.*

23. The *non-transitory* machine readable medium of claim 22, wherein the actuator *of the first computing device* is a speaker.

24. The *non-transitory* machine readable medium of claim 23, wherein the sensor *of the second computing device* is a microphone.

25. The *non-transitory* machine readable medium of claim 24, wherein the acoustic signals generated by the first and second computing devices are selected from a group comprising of maximum length sequence signal and a chirp signal.

[26. The machine readable medium of claim 20, further including:

estimating an emission start time of when the acoustic signal was emitted from the actuator.]

[27. The machine readable medium of claim 26, wherein the estimating of the emission start time includes the first computing device using a loopback device to estimate the emission start time; and using the emission start time to determine the estimate of a time for the acoustic signal to travel from the actuator of the first computing device to the sensor second computing device.]

28. The *non-transitory* machine readable medium of claim 20, wherein the method further includes:

prior to the third computing device computing the physical locations, computing an initial estimation of the physical location of the sensor of the second computer and actuator of the first computer via a video modality.

29. The *non-transitory* machine readable medium of claim 20, wherein the method further includes:

prior to the third computing device computing the physical locations, computing an initial estimation of the physical location of the sensor of the second computer and actuator of the first computer via multidimensional scaling.

30. A *non-transitory* machine readable medium having stored thereon a set of instructions, which when executed, cause the machine to perform a method comprising [of]:

a first computing device transmitting a wireless signal to a second *computing device* and *a* third computing [devices] *device*, the signal requesting an actuator of the second computing device generate an acoustic signal to be received by a sensor of the third computing device, wherein the actuator and sensor are unsynchronized *at least due to a time-varying delay occurs between when the second computing device issues a command to generate the acoustic signal and when the actuator generates the acoustic signal, the time-varying delay at least due to time-varying processor load of the second computing device*; and the first computing device computing, based on a time estimate for the acoustic signal to travel from the actuator of the second computing device to the sensor of the third computing device, a physical location of at least one of a set including the actuator of the second computing device and the sensor of the third computing device*;*

*wherein computing the physical location of at least one of the set including the actuator of the second computing device and the sensor of the third computing device includes jointly estimating, using a nonlinear least squares (NLS) computation, (i) the at least one of the set including the actuator of the second computing device and the sensor of the third computing device and (ii) the time-varying delay between when the second computing device issues the command to generate the acoustic signal and when the actuator generates the acoustic signal.*

31. The *non-transitory* machine readable medium of claim 30, wherein the method further includes:

the first computing device transmitting the wireless signal to the second *computing device* and a fourth computing [devices] *device*, the signal requesting the actuator of the second computing device generate the acoustic signal to be received by a sensor of the fourth computing device, wherein the actuator and the sensor of the fourth computing device are unsynchronized; and the first computing device computing, based on an time estimate for the acoustic signal to travel from the actuator of the second computing device to the sensor of the fourth computing device, a physical location of at least one of a set including the actuator of the second computing device and the sensor of the fourth computing device*;*

*wherein computing the physical location of at least one of the set including the actuator of the second computing device and the sensor of the fourth computing device includes jointly estimating, using the NLS computation, (i) the at least one of the set including the actuator of the second computing device and the sensor of the fourth computing device and (ii) the time-varying delay between when the second computing device issues the command to generate the acoustic signal and when the actuator generates the acoustic signal.*

32. The *non-transitory* machine readable medium of claim 31, wherein the method further includes:

the first computing device transmitting a second wireless signal to the second *computing device* and *the* third computing [devices] *device*, the signal requesting an actuator of the third computing device generate [an] *a second* acoustic signal to be received by a sensor of the second computing device, wherein the actuator of the third computing device and a sensor of the second computing device are unsynchronized *at least due to a second time-varying delay occurs between when the third computing device issues a command to generate the second acoustic signal and when the actuator of the third computing device generates the second acoustic signal, the second time-varying delay at least due to time-varying processor load of the third computing device*; and the first computing device computing, based on [an] *a* time estimate for the *second* acoustic signal to travel from the actuator of the third computing device to the sensor of the second computing device, a physical location of at least one of a set including the actuator of the third computing device and the sensor of the second computing device*;*

*wherein computing the physical location of at least one of the set including the actuator of the third computing device and the sensor of the second computing device includes jointly estimating, using the NLS computation, (i) the at least one of the set including the actuator of the third computing device and the sensor of the second computing device and (ii) the second time-varying delay between when the third computing device issues the command to generate the second acoustic signal and when the actuator of the third computing device generates the second acoustic signal.*

33. The *non-transitory* machine readable medium of claim 32, wherein the actuator *of the second computing device* is a speaker.

34. The *non-transitory* machine readable medium of claim 33, wherein the sensor *of the third computing device* is a microphone.

35. The *non-transitory* machine readable medium of claim 34, wherein the acoustic signals to be generated by the second and third computing devices are selected from a group comprising of maximum length sequence signal, and a chirp signal.

[36. The machine readable medium of claim 30, further including:

estimating an emission start time of when the acoustic signal was emitted from the actuator of the second computing device.]

[37. The machine readable medium of claim 36, wherein estimating the emission start time includes the second computing device using a loopback device to compute the emission start time;

using emission start time to determine the estimate of a time for the acoustic signal to travel from the actuator of the second computing device to the sensor third computing device.]

38. The *non-transitory* machine readable medium of claim 30, wherein the method further includes:

prior to the first computer determining a physical location of at least one of the group including the actuator of the second computing device and the sensor of the third computer, the first computer computing an initial estimation of the physical location of the actuator of the second computer and the sensor of the third computing device via video modality.

39. The *non-transitory* machine readable medium of claim [30] *31*, wherein the method further includes:

prior to the first computer determining a physical location of at least one of the group including the actuator of the second computing device and the sensor of the [third] *fourth* computer, the first computer computing an initial estimation of the physical location of the actuator of the second computer and the sensor of the [third] *fourth* computing device via video modality.

*40. A method comprising:*

*causing an actuator of a first computing device to generate a first acoustic signal;*

*receiving a first timestamp indicating when the first computing device issued a command to generate the first acoustic signal, wherein a first time-varying delay occurs between when the first computing device issues the command to generate the first acoustic signal and when the actuator of the first computing device generates the first acoustic signal, the first time-varying delay at least due to time-varying processor load of the first computing device;*

*receiving a first time of arrival signal from a second computing device having a sensor, wherein the first time of arrival signal is indicative of a time for the first acoustic signal to travel from the actuator of the first computing device to the sensor of the second computing device, wherein the actuator of the first computing device and the sensor of the second computing device are unsynchronized at least due to the first time-varying delay;*

*receiving a second time of arrival signal from a third computing device having a sensor, wherein the second time of arrival signal is indicative of a time for the first acoustic signal to travel from the actuator of the first computing device to the sensor of the third computing device, wherein the actuator of the first computing device and the sensor of the third computing device are unsynchronized at least due to the first time-varying delay;*

*computing, based on i) the first time of arrival signal and ii) the first timestamp, at least one of a physical location of the sensor of the second computing device or a physical location of the actuator of the first computing device, wherein computing at least one of the physical location of the sensor of the second computing device or the physical location of the actuator of the first computing device includes jointly estimating, using a nonlinear least squares (NLS) computation, (i) the at least one of the physical location of the sensor of the second computing device or the physical location of the actuator of the first computing device and (ii) the first time-varying delay between when the first computing device issues the command to generate the first acoustic signal and when the actuator of the first computing device generates the first acoustic signal; and*

*computing, based on i) the second time of arrival signal and ii) the first timestamp, at least one of a physical location of the sensor of the third computing device or the physical location of the actuator of the actuator of the first computing device, wherein computing at least one of the physical location of the sensor of the third computing device or the physical location of the actuator of the first computing device includes jointly estimating, using the NLS computation, (i) the at least one of the physical location of the sensor of the third computing device or the physical location of the actuator of the first computing device and (ii) the first time-varying delay between when the first computing device issues the command to generate the first acoustic signal and when the actuator of the first computing device generates the first acoustic signal.*

*41. The method of claim 40, wherein causing the actuator of the first computing device to generate the first acoustic signal comprises transmitting a wireless signal to the first computing device that requests that the actuator of the first computing device generate the first acoustic signal.*

*42. The method of claim 40, wherein the first time of arrival signal includes a time for the first acoustic signal to travel from the actuator of the first computing device to the sensor of the second computing device.*

*43. The method of claim 40, wherein the first time of arrival signal includes a time at which the first acoustic signal arrived at the sensor of the second computing device.*

*44. The method of claim 40, wherein the second time of arrival signal includes a time for the first acoustic signal to travel from the actuator of the first computing device to the sensor of the third computing device.*

*45. The method of claim 40, wherein the second time of arrival signal includes a time at which the first acoustic signal arrived at the sensor of the third computing device.*

*46. The method of claim 40, wherein the first computing device includes a sensor;*

*wherein the second computing device includes an actuator;*

*wherein the method further comprises:*

*causing the actuator of the second computing device to generate a second acoustic signal;*

*receiving a second timestamp indicating when the second computing device issued a command to generate the second acoustic signal, wherein a second time-varying delay occurs between when the second computing device issues the command to generate the second acoustic signal and when the actuator of the second computing device generates the first acoustic signal, the second time-varying delay at least due to time-varying processor load of the second computing device;*

*receiving a third time of arrival signal from the first computing device, wherein the third time of arrival signal is indicative of a time for the second acoustic signal to travel from the actuator of the second computing device to the sensor of the first computing device, wherein the actuator of the second computing device and the sensor of the first computing device are unsynchronized at least due to the second time-varying delay; and*

*computing, based on i) the third time of arrival signal and ii) the second timestamp, at least one of a physical location of the sensor of the first computing device or a physical location of the actuator of the second computing device, wherein computing at least one of the physical location of the sensor of the first computing device or the physical location of the actuator of the second computing device includes jointly estimating, using the nonlinear least squares (NLS) computation, (i) the at least one of the physical location of the sensor of the first computing device or the physical location of the actuator of the second computing device and (ii) the second time-varying delay between when the second computing device issues the command to generate the second acoustic signal and when the actuator of the second computing device generates the second acoustic signal.*

*47. The method of claim 40, wherein the actuator of the first computing device is a speaker.*

*48. The method of claim 47, wherein the sensor of the second computing device is a microphone.*

*49. The method of claim 40, wherein the first acoustic signal is a maximum length sequence signal or a chirp signal.*

*50. The method of claim 40, further comprising computing an initial estimate of the physical location of the sensor of the second computing device and an initial estimate of the physical location of the actuator of the first computing device based on information captured by a camera.*

*51. The method of claim 40, further comprising computing an initial estimate of the physical location of the sensor of the second computing device and an initial estimate of the physical location of the actuator of the first computing device via multidimensional scaling.*

*52. A method comprising:*

*causing an actuator of a first computing device to generate a first acoustic signal, the first acoustic signal to be received by a sensor of a second computing device, wherein the actuator of the first computing device and the sensor of the second computing device are unsynchronized at least due to a first time-varying delay that occurs between when the first computing device issues a command to generate the first acoustic signal and when the actuator of the first computing device generates the first acoustic signal, the first time-varying delay at least due to time-varying processor load of the first computing device;*

*computing at the third computing device, based on a time estimate for the first acoustic signal to travel from the actuator of the first computing device to the sensor of the second computing device, at least one of a physical location of the actuator of the first computing device or a physical location of the sensor of the second computing device, wherein computing at least one of the physical location of the actuator of the first computing device or the physical location of the sensor of the second computing device includes jointly estimating, using a nonlinear least squares (NLS) computation, (i) the at least one of the physical location of the actuator of the first computing device or the physical location of the sensor of the second computing device and (ii) the first time-varying delay between when the first computing device issues the command to generate the first acoustic signal and when the actuator of the first computing device generates the first acoustic signal;*

*wherein the time estimate for the first acoustic signal to travel from the actuator of the first computing device to the sensor of the second computing device is based on (i) a first timestamp, transmitted by the first computing device, that indicates when the first computing device issues the command to generate the first acoustic signal, and (ii) a time when the second computing device receives the first acoustic signal.*

*53. The method of claim 52, wherein the first acoustic signal is to be received by a sensor of a fourth computing device, wherein the actuator of the first computing device and the sensor of the fourth computing device are unsynchronized at least due to the first time-varying delay that occurs between when the first computing device issues the command to generate the first acoustic signal and when the actuator of the first computing device generates the first acoustic signal;*

*wherein the method further comprises the third computing device computing, based on a time estimate for the first acoustic signal to travel from the actuator of the first computing device to the sensor of the fourth computing device, at least one of the physical location of the actuator of the first computing device or a physical location of the sensor of the fourth computing device, wherein computing at least one of the physical location of the actuator of the first computing device or the physical location of the sensor of the fourth computing device includes jointly estimating, using the nonlinear least squares (NLS) computation, (i) the at least one of the physical location of the actuator of the first computing device or the physical location of the sensor of the fourth computing device and (ii) the first time-varying delay between when the first computing device issues the command to generate the first acoustic signal and when the actuator of the first computing device generates the first acoustic signal;*

*wherein the time estimate for the first acoustic signal to travel from the actuator of the first computing device to the sensor of the fourth computing device is based on (i) the first timestamp that indicates when the first computing device issues the command to generate the first acoustic signal, and (ii) a time when the fourth computing device receives the first acoustic signal.*

*54. The method of claim 53, further comprising:*

*causing an actuator of the second computing device to generate a second acoustic signal, the second acoustic signal to be received by a sensor of the first computing device, wherein the actuator of the second computing device and the sensor of the first computing device are unsynchronized at least due to a second time-varying delay that occurs between when the second computing device issues a command to generate the second acoustic signal and when the actuator of the second computing device generates the second acoustic signal, the second time-varying delay at least due to time-varying processor load of the second computing device; and*

*computing at the third computing device, based on a time estimate for the second acoustic signal to travel from the actuator of the second computing device to the sensor of the first computing device, at least one of a physical location of the actuator of the second computing device or a physical location of the sensor of the first computing device, wherein computing at least one of the physical location of the actuator of the second computing device or the physical location of the sensor of the first computing device includes jointly estimating, using the nonlinear least squares (NLS) computation, (i) the at least one of the physical location of the actuator of the second computing device or the physical location of the sensor of the first computing device and (ii) the second time-varying delay between when the second computing device issues the command to generate the second acoustic signal and when the actuator of the second computing device generates the second acoustic signal;*

*wherein the time estimate for the second acoustic signal to travel from the actuator of the second computing device to the sensor of the first computing device is based on (i) a third timestamp, transmitted by the second computing device, that indicates when the second computing device issues the command to generate the second acoustic signal, and (ii) a time when the first computing device receives the second acoustic signal.*

*55. The method of claim 52, wherein the actuator of the first computing device is a speaker.*

*56. The method of claim 55, wherein the sensor of the second computing device is a microphone.*

*57. The method of claim 52, wherein the first acoustic signal is a maximum length sequence signal or a chirp signal.*

*58. The method of claim 52, further comprising computing at the third computing device an initial estimate of the physical location of the sensor of the second computing device and*

*an initial estimate of the physical location of the actuator of the first computing device based on information captured by a camera.*

*59. The method of claim 52, further comprising computing at the third computing device an initial estimate of the physical location of the sensor of the second computing device and an initial estimate of the physical location of the actuator of the first computing device via multidimensional scaling.*

*60. A first computing device comprising:*

*a communication device;*

*a processor configured to:*

*cause an actuator of a second computing device to generate a first acoustic signal, wherein a first time-varying delay occurs between when the second computing device issues a command to generate the first acoustic signal and when the actuator of the second computing device generates the first acoustic signal, the first time-varying delay at least due to time-varying processor load of the second computing device,*

*receive a first time of arrival signal from a third computing device having a sensor, wherein the first time of arrival signal is indicative of a time for the first acoustic signal to travel from the actuator of the second computing device to the sensor of the third computing device, wherein the actuator of the second computing device and the sensor of the third computing device are unsynchronized at least due to the first time-varying delay that occurs between when the second computing device issues the command to generate the first acoustic signal and when the actuator of the second computing device generates the first acoustic signal,*

*receive a second time of arrival signal from a fourth computing device having a sensor, wherein the second time of arrival signal is indicative of a time for the first acoustic signal to travel from the actuator of the second computing device to the sensor of the fourth computing device, wherein the actuator of the second computing device and the sensor of the fourth computing device are unsynchronized at least due to the first time-varying delay that occurs between when the second computing device issues the command to generate the first acoustic signal and when the actuator of the second computing device generates the first acoustic signal,*

*compute, based on i) the first time of arrival signal and ii) an estimate of a time at which the first acoustic signal is emitted from the actuator of the second computing device, at least one of a physical location of the actuator of the second computing device or a physical location of the sensor of the third computing device, wherein computing at least one of the physical location of the actuator of the second computing device or the physical location of the sensor of the third computing device includes jointly estimating, using a nonlinear least squares (NLS) computation, (i) the at least one of the physical location of the actuator of the second computing device or the physical location of the sensor of the third computing device and (ii) the first time-varying delay between when the second computing device issues the command to generate the first acoustic signal and when the actuator of the second computing device generates the first acoustic signal, and*

*compute, based on i) the second time of arrival signal and ii) the estimate of the time at which the first acoustic signal is emitted from the actuator of the second computing device, at least one of the physical location of the actuator of the actuator of the second computing device or a physical location of the sensor of the fourth computing device, wherein computing at least one of the physical location of the actuator of the second computing device or the physical location of the sensor of the fourth computing device includes jointly estimating, using the NLS computation, (i) the at least one of the physical location of the actuator of the second computing device or the physical location of the sensor of the fourth computing device and (ii) the first time-varying delay between when the second computing device issues the command to generate the first acoustic signal and when the actuator of the second computing device generates the first acoustic signal.*

*61. The first computing device of claim 60, wherein the processor is configured to cause the first computing device to transmit a request signal to the second computing device that requests that the actuator of the second computing device generate the first acoustic signal.*

*62. The first computing device of claim 61, wherein the first communication device is a wireless communication device, and wherein the request signal is a wireless request signal.*

*63. The first computing device of claim 60, wherein the first time of arrival signal includes a time for the first acoustic signal to travel from the actuator of the second computing device to the sensor of the third computing device.*

*64. The first computing device of claim 60, wherein the first time of arrival signal includes a time at which the first acoustic signal arrived at the sensor of the third computing device.*

*65. The first computing device of claim 60, wherein the second time of arrival signal includes a time for the first acoustic signal to travel from the actuator of the second computing device to the sensor of the fourth computing device.*

*66. The first computing device of claim 60, wherein the second time of arrival signal includes a time at which the first acoustic signal arrived at the sensor of the fourth computing device.*

*67. The first computing device of claim 60, wherein the second computing device includes a sensor;*

*wherein the third computing device includes an actuator;*

*wherein the processor is configured to:*

*cause the actuator of the third computing device to generate a second acoustic signal, wherein a second time-varying delay occurs between when the third computing device issues a command to generate the second acoustic signal and when the actuator of the third computing device generates the second acoustic signal, the second time-varying delay at least due to time-varying processor load of the third computing device,*

*receive a third time of arrival signal from the second computing device, wherein the third time of arrival signal is indicative of a time for the second acoustic signal to travel from the actuator of the third computing device to the sensor of the second computing device, wherein the actuator of the third computing device and the sensor of the second computing device are unsynchronized at least due to the second time-varying delay that occurs between when the third computing device issues the command to generate the second acoustic signal and when the actuator of the third computing device generates the second acoustic signal; and*

*compute, based on i) the third time of arrival signal and ii) the estimate of the time at which the second acoustic signal is emitted from the actuator of the third computing device, at least one of a physical location of the actuator*

*of the third computing device or a physical location of the sensor of the second computing device, wherein computing at least one of the physical location of the actuator of the third computing device or the physical location of the sensor of the second computing device includes jointly estimating, using the NLS computation, (i) the at least one of the physical location of the actuator of the third computing device or the physical location of the sensor of the second computing device and (ii) the second time-varying delay between when the third computing device issues the command to generate the second acoustic signal and when the actuator of the third computing device generates the second acoustic signal.*

*68. The first computing device of claim 60, wherein the first acoustic signal is a maximum length sequence signal or a chirp signal.*

*69. The first computing device of claim 60, wherein the processor is configured to cause the first computing device to compute an initial estimate of the physical location of the sensor of the third computing device and an initial estimate of the physical location of the actuator of the second computing device based on information captured by a camera.*

*70. The first computing device of claim 60, wherein the processor is configured to cause the first computing device to compute an initial estimate of the physical location of the sensor of the second computing device and an initial estimate of the physical location of the actuator of the first computing device via multidimensional scaling.*

*71. A first computing device comprising:*

*a communication device;*

*a processor configured to:*

*cause an actuator of a second computing device to generate a first acoustic signal, the first acoustic signal to be received by a sensor of a third computing device, wherein the actuator of the second computing device and the sensor of the third computing device are unsynchronized at least due to a first time-varying delay that occurs between when the second computing device issues a command to generate the first acoustic signal and when the actuator of the second computing device generates the first acoustic signal, the first time-varying delay at least due to time-varying processor load of the second computing device, and*

*compute, based on a time estimate for the first acoustic signal to travel from the actuator of the second computing device to the sensor of the third computing device, at least one of a physical location of the actuator of the second computing device or a physical location of the sensor of the third computing device, wherein computing at least one of the physical location of the actuator of the second computing device or the physical location of the sensor of the third computing device includes jointly estimating, using a nonlinear least squares (NLS) computation, (i) the at least one of the physical location of the actuator of the second computing device or the physical location of the sensor of the third computing device and (ii) the first time-varying delay between when the second computing device issues the command to generate the first acoustic signal and when the actuator of the second computing device generates the first acoustic signal;*

*wherein the time estimate for the first acoustic signal to travel from the actuator of the second computing device to the sensor of the third computing device is based on (i) a first timestamp, transmitted by the second computing device, that indicates when the second computing device issues the command to generate the first acoustic signal, and (ii) a time when the third computing device receives the first acoustic signal.*

*72. The first computing device of claim 71, wherein the first acoustic signal is to be received by a sensor of a fourth computing device, wherein the actuator of the second computing device and the sensor of the fourth computing device are unsynchronized at least due to the first time-varying delay that occurs between when the second computing device issues the command to generate the first acoustic signal and when the actuator of the second computing device generates the first acoustic signal;*

*wherein the processor is configured to compute, based on a time estimate for the first acoustic signal to travel from the actuator of the second computing device to the sensor of the fourth computing device, at least one of the physical location of the actuator of the second computing device or a physical location of the sensor of the fourth computing device, wherein computing at least one of the physical location of the actuator of the second computing device or the physical location of the sensor of the fourth computing device includes jointly estimating, using the nonlinear least squares (NLS) computation, (i) the at least one of the physical location of the actuator of the second computing device or the physical location of the sensor of the fourth computing device and (ii) the first time-varying delay between when the second computing device issues the command to generate the first acoustic signal and when the actuator of the second computing device generates the first acoustic signal;*

*wherein the time estimate for the first acoustic signal to travel from the actuator of the second computing device to the sensor of the fourth computing device is based on (i) the first timestamp that indicates when the second computing device issues the command to generate the first acoustic signal, and (ii) a time when the fourth computing device receives the first acoustic signal.*

*73. The first computing device of claim 72, wherein the processor is configured to:*

*cause an actuator of the third computing device to generate a second acoustic signal, the second acoustic signal to be received by a sensor of the second computing device, wherein the actuator of the third computing device and the sensor of the second computing device are unsynchronized at least due to a second time-varying delay that occurs between when the third computing device issues a command to generate the second acoustic signal and when the actuator of the second computing device generates the second acoustic signal, the second time-varying delay at least due to time-varying processor load of the third computing device; and*

*compute, based on a time estimate for the second acoustic signal to travel from the actuator of the third computing device to the sensor of the second computing device, at least one of a physical location of the actuator of the third computing device or a physical location of the sensor of the second computing device, wherein computing at least one of the physical location of the actuator of the third computing device or the physical location of the sensor of the second computing device includes jointly estimating, using the nonlinear least squares (NLS) computation, (i) the at least one of the physical location of the actuator of the third computing device or the physical location of the sensor of the second computing device and (ii) the second time-varying delay between when the third computing device issues the command to*

*generate the second acoustic signal and when the actuator of the third computing device generates the second acoustic signal;*

*wherein the time estimate for the second acoustic signal to travel from the actuator of the third computing device to the sensor of the second computing device is based on (i) a fourth timestamp, transmitted by the third computing device, that indicates when the third computing device issues the command to generate the second acoustic signal, and (ii) a time when the second computing device receives the second acoustic signal.*

*74. The first computing device of claim 71, wherein the first acoustic signal is a maximum length sequence signal or a chirp signal.*

*75. The first computing device of claim 71, wherein the processor is configured to cause the first computing device to compute an initial estimate of the physical location of the sensor of the third computing device and an initial estimate of the physical location of the actuator of the second computing device based on information captured by a camera.*

*76. The first computing device of claim 71, wherein the processor is configured to compute an initial estimate of the physical location of the sensor of the third computing device and an initial estimate of the physical location of the actuator of the second computing device via multidimensional scaling.*

*77. The first computing device of claim 71, wherein the processor is configured to cause the first computing device to transmit a request signal to the second computing device that requests that the actuator of the second computing device generate the first acoustic signal.*

*78. The first computing device of claim 77, wherein the communication device is a wireless communication device, and wherein the request signal is a wireless request signal.*

*79. A system comprising:*

*a first computing device having an actuator, wherein the first computing device is configured to cause the actuator of the first computing device to generate a first acoustic signal, wherein a first time-varying delay occurs between when the first computing device issues a command to generate the first acoustic signal and when the actuator of the first computing device generates the first acoustic signal, the first time-varying delay at least due to time-varying processor load of the first computing device;*

*a second computing device having a sensor;*

*wherein the sensor of the second computing device and the actuator of the first computing device are unsynchronized at least due to the first time-varying delay that occurs between when the first computing device issues the command to generate the first acoustic signal and when the actuator of the first computing device generates the first acoustic signal;*

*a third computing device;*

*a fourth computing device having a sensor;*

*wherein the sensor of the fourth computing device and the actuator of the first computing device are unsynchronized at least due to the first time-varying delay that occurs between when the first computing device issues the command to generate the first acoustic signal and when the actuator of the first computing device generates the first acoustic signal;*

*wherein the third computing device is communicatively coupled to the first computing device, the second computing device and the fourth computing device;*

*wherein the first computing device is configured to transmit a first timestamp that indicates when the first computing device issued the command to generate the first acoustic signal;*

*wherein one of the second computing device or the third computing device is configured to generate, based on the first timestamp, a first time estimate for the first acoustic signal to travel from the actuator of the first computing device to the sensor of the second computing device:*

*wherein the third computing device is configured to compute, based on the first time estimate, at least one of a physical location of the sensor of the second computing device or a physical location of the actuator of the first computing device, wherein computing at least one of the physical location of the sensor of the second computing device or the physical location of the actuator of the first computing device includes jointly estimating, using a nonlinear least squares (NLS) computation, (i) the at least one of the physical location of the sensor of the second computing device or the physical location of the actuator of the first computing device, and (ii) the first time-varying delay between when the first computing device issues the command to generate the first acoustic signal and when the actuator of the first computing device generates the first acoustic signal;*

*wherein one of the fourth computing device or the third computing device is configured to generate, based on the first timestamp, a second time estimate for the first acoustic signal to travel from the actuator of the first computing device to the sensor of the fourth computing device; and*

*wherein the third computing device is configured to compute, based on the second time estimate, at least one of a physical location of the sensor of the fourth computing device or the physical location of the actuator of the first computing device, wherein computing at least one of the physical location of the sensor of the fourth computing device or the physical location of the actuator of the first computing device includes jointly estimating, using the nonlinear least squares (NLS) computation, (i) the at least one of the physical location of the sensor of the fourth computing device or the physical location of the actuator of the first computing device, and (ii) the first time-varying delay between when the first computing device issues the command to generate the first acoustic signal and when the actuator of the first computing device generates the first acoustic signal.*

*80. The system of claim 79, wherein the first computing device includes a sensor;*

*wherein the second computing device includes an actuator, wherein the second computing device is configured to cause the actuator of the second computing device to generate a second acoustic signal, wherein a second time-varying delay occurs between when the second computing device issues a command to generate the second acoustic signal and when the actuator of the second computing device generates the second acoustic signal, the second time-varying delay at least due to time-varying processor load of the second computing device;*

*wherein the second computing device is configured to transmit a second timestamp that indicates when the second computing device issued the command to generate the second acoustic signal;*

*wherein one of the first computing device or the third computing device is configured to generate, based on the second timestamp, a third time estimate for the second*

*acoustic signal to travel from the actuator of the second computing device to the sensor of the first computing device; and*

*wherein the third computing device is configured to compute, based on the third time estimate, at least one of a physical location of the sensor of the first computing device or a physical location of the actuator of the second computing device, wherein computing at least one of the physical location of the sensor of the first computing device or the physical location of the actuator of the second computing device includes jointly estimating, using the nonlinear least squares (NLS) computation, (i) the at least one of the physical location of the sensor of the first computing device or the physical location of the actuator of the second computing device, and (ii) the second time-varying delay between when the second computing device issues the command to generate the second acoustic signal and when the actuator of the second computing device generates the second acoustic signal.*

*81. The system of claim 80, wherein the actuator of the first computing device is a speaker.*

*82. The system of claim 81, wherein the sensor of the second computing device is a microphone.*

*83. The system of claim 82, wherein each of the first acoustic signal and the second acoustic signal is one of a maximum length sequence signal or a chirp signal.*

*84. The system of claim 79, wherein the third computing device is configured to compute an initial estimation of the physical location of the sensor of the second computing device and an initial estimation of the physical location of the actuator of the first computing device via a video modality prior to the third computing device computing at least one of the physical location of the sensor of the second computing device or the physical location of the actuator of the first computing device.*

*85. The system of claim 79, wherein the third computing device is configured to compute an initial estimation of the physical location of the sensor of the second computing device and an initial estimation of the physical location of the actuator of the first computing device via multidimensional scaling prior to the third computing device computing at least one of the physical location of the sensor of the second computing device or the physical location of the actuator of the first computing device.*

*86. A first computing device comprising:*

*a wireless communication device;*

*a processor configured to:*

*cause the wireless communication device to transmit a wireless signal to a second computing device and a third computing device, the wireless signal requesting an actuator of the second computing device to generate a first acoustic signal to be received by a sensor of the third computing device, wherein the actuator of the second computing device and the sensor of the third computing device are unsynchronized at least due to a first time-varying delay that occurs between when the second computing device issues a command to generate the first acoustic signal and when the actuator of the second computing device generates the first acoustic signal, the first time-varying delay at least due to time-varying processor load of the second computing device, and*

*compute, based on a time estimate for the first acoustic signal to travel from the actuator of the second computing device to the sensor of the third computing device, at least one of a physical location of the actuator of the second computing device or a physical location of the sensor of the third computing device, wherein computing at least one of the physical location of the actuator of the second computing device or the physical location of the sensor of the third computing device includes jointly estimating, using a nonlinear least squares (NLS) computation, (i) the at least one of the physical location of the actuator of the second computing device or the physical location of the sensor of the third computing device, and (ii) the first time-varying delay between when the second computing device issues the command to generate the first acoustic signal and when the actuator of the second computing device generates the first acoustic signal;*

*wherein the time estimate for the first acoustic signal to travel from the actuator of the second computing device to the sensor of the third computing device is based on (i) a first timestamp that indicates when the second computing device issues the command to generate the first acoustic signal, and (ii) a time when the third computing device receives the first acoustic signal.*

*87. The first computing device of claim 86, wherein the processor is configured to:*

*cause the wireless communication device to transmit the wireless signal to the second computing device and a fourth computing device, the wireless signal requesting the actuator of the second computing device to generate the first acoustic signal to be received by a sensor of the fourth computing device, wherein the actuator of the second computing device and the sensor of the fourth computing device are unsynchronized at least due to the first time-varying delay that occurs between when the second computing device issues the command to generate the first acoustic signal and when the actuator of the first computing device generates the first acoustic signal; and*

*compute, based on a time estimate for the first acoustic signal to travel from the actuator of the second computing device to the sensor of the fourth computing device, at least one of a physical location of the actuator of the second computing device or a physical location of the sensor of the fourth computing device, wherein computing at least one of the physical location of the actuator of the second computing device or the physical location of the sensor of the fourth computing device includes jointly estimating, using the nonlinear least squares (NLS) computation, (i) the at least one of the physical location of the actuator of the second computing device or the physical location of the sensor of the fourth computing device and (ii) the first time-varying delay between when the second computing device issues the command to generate the first acoustic signal and when the actuator of the second computing device generates the first acoustic signal;*

*wherein the time estimate for the first acoustic signal to travel from the actuator of the second computing device to the sensor of the fourth computing device is based on (i) the first timestamp that indicates when the second computing device issues the command to generate the first acoustic signal, and (ii) a time when the fourth computing device receives the first acoustic signal.*

*88. The first computing device of claim 87, wherein the processor is configured to:*

*cause the wireless communication device to transmit a second wireless signal to the second computing device and the third computing device, the second wireless signal requesting an actuator of the third computing device to generate a second acoustic signal to be*

*received by a sensor of the second computing device, wherein the actuator of the third computing device and the sensor of the second computing device are unsynchronized at least due to a second time-varying delay that occurs between when the third computing device issues a command to generate the second acoustic signal and when the actuator of the third computing device generates the second acoustic signal, the second time-varying delay at least due to time-varying processor load of the third computing device; and*

*compute, based on a time estimate for the second acoustic signal to travel from the actuator of the third computing device to the sensor of the second computing device, at least one of a physical location of the actuator of the third computing device or a physical location of the sensor of the second computing device, wherein computing at least one of the physical location of the actuator of the third computing device or the physical location of the sensor of the second computing device includes jointly estimating, using the nonlinear least squares (NLS) computation, (i) the at least one of the physical location of the actuator of the third computing device or the physical location of the sensor of the second computing device, and (ii) the second time-varying delay between when the third computing device issues the command to generate the second acoustic signal and when the actuator of the third computing device generates the second acoustic signal;*

*wherein the time estimate for the second acoustic signal to travel from the actuator of the third computing device to the sensor of the second computing device is based on (i) a fourth timestamp that indicates when the third computing device issues the command to generate the second acoustic signal, and (ii) a time when the second computing device receives the second acoustic signal.*

*89. The first computing device of claim 86, wherein the processor is configured to compute an initial estimation of the physical location of the actuator of the second computing device and an initial estimation of the physical location of the actuator of the sensor of the third computing device via information captured by a camera, prior to computing at least one of the physical location of the actuator of the second computing device or the physical location of the sensor of the third computing device.*

*90. The first computing device of claim 86, wherein the processor is configured to compute an initial estimation of the physical location of the actuator of the second computing device and an initial estimation of the physical location of the sensor of the third computing device via multidimensional scaling, prior to computing at least one of the physical location of the actuator of the second computing device or the physical location of the sensor of the third computing device.*

* * * * *